W. H. ROLFE & C. H. BAKER.
STREET CLEANING PAN.
APPLICATION FILED JAN. 15, 1910.

981,883.

Patented Jan. 17, 1911.
2 SHEETS—SHEET 1.

Witnesses
T. P. Britt
E. C. Duffy

Inventor
William H. Rolfe
Charles H. Baker

By O. E. Duffy & Son
Attorneys

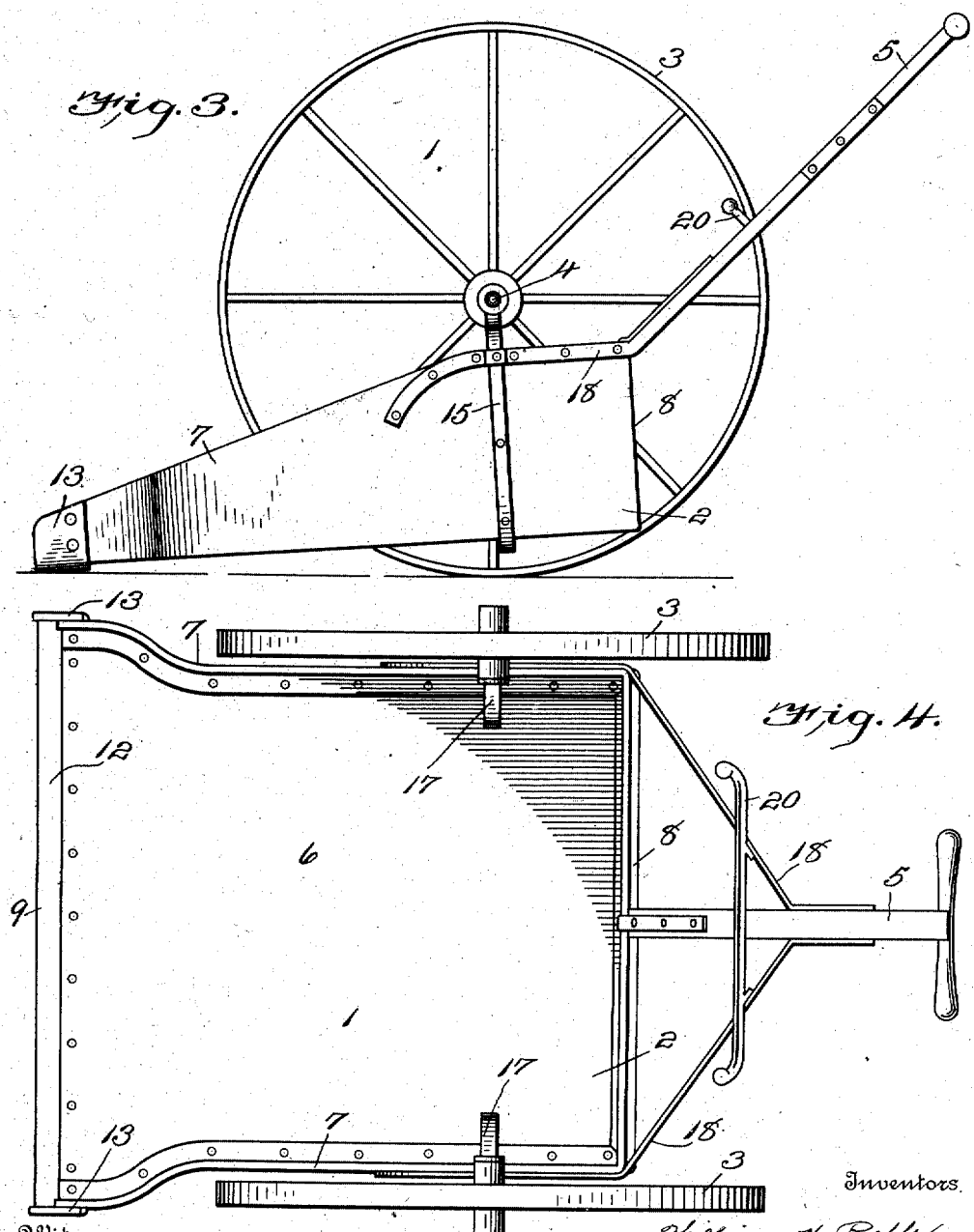

UNITED STATES PATENT OFFICE.

WILLIAM HENRY ROLFE AND CHARLES HENDERSON BAKER, OF WABASH, INDIANA.

STREET-CLEANING PAN.

981,883.  Specification of Letters Patent.  Patented Jan. 17, 1911.

Application filed January 15, 1910. Serial No. 538,327.

*To all whom it may concern:*

Be it known that we, WILLIAM H. ROLFE and CHARLES H. BAKER, citizens of the United States, residing at Wabash, in the county of Wabash and State of Indiana, have invented certain new and useful Improvements in Street-Cleaning Pans; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a street cleaning pan and has for its object to provide a pan to be used on streets, roadways and the like which is so constructed and arranged that it can be used on all parts of the street and can be employed close up to curbs or obstructions in such manner as to leave no space between the curbing or obstruction and the mouth of the pan.

With this object in view this invention consists in the novel construction of the axle upon which the pan rests, and in the novel construction of the pan, and in certain combinations of parts, all of which will be first fully described and afterward specifically pointed out in the appended claims.

Figure 1:
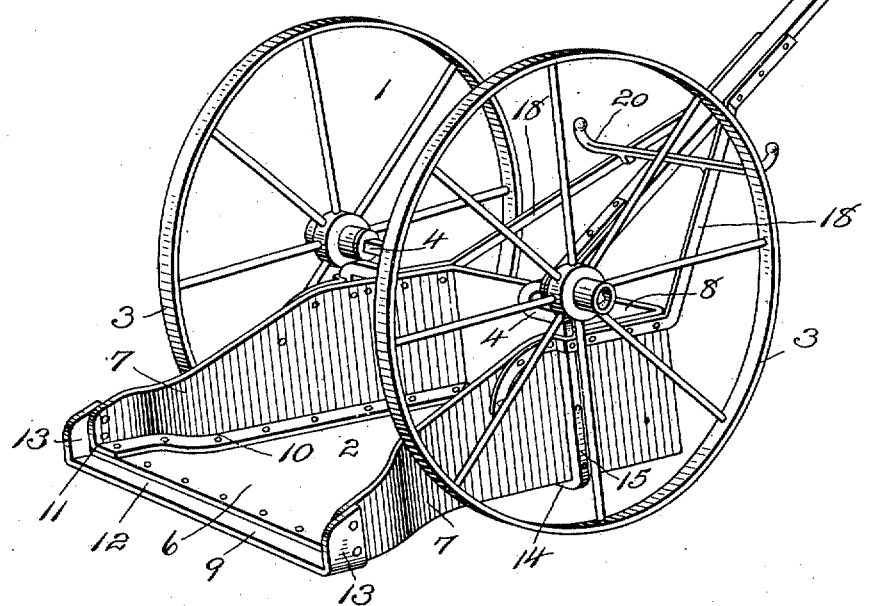
Figure 2:
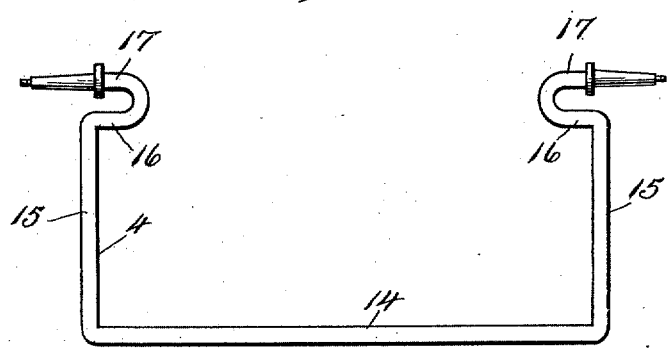

Referring to the accompanying drawing: Figure 1 is a perspective view of the pan. Fig. 2 is an elevation of the axle. Fig. 3 is a side elevation showing one wheel removed, and Fig. 4 is a top plan view.

Like numerals of reference indicate the same parts throughout the several figures in which;

1 indicates the device which comprises the pan 2, wheels 3, axle 4 and handle 5.

The pan 2 as shown is composed of the bottom 6, sloping sides 7 and back 8. As will appear from Fig. 4 the mouth 9 of the pan is flared outwardly from the point 10 to the edge 11 of the mouth, and it will also be seen that a reinforcing strip 12 is arranged at the end of the mouth 9, said strip 12 having its ends 13 turned up over the sides 7 of the pan and is securely riveted or otherwise fastened thereto. In order to increase the life of the pan as well as to add strength and rigidity thereto we prefer to construct the strip 12 of steel sufficiently tempered to withstand the abrasive action to which the mouth of the pan is subjected.

The axle 4 is of peculiar form as will appear from Fig. 2 and is so constructed as to form a cradle for the pan. The central portion 14 of the axle 4 is of a length sufficient to support the bottom of the pan, and at each side of the pan said axle is bent upwardly at 15 snugly hugging the side of the pan as shown. The sides and bottom of the pan are securely riveted or otherwise fastened to the central portion 14 and the vertical portions 14 of the axle as shown in such manner that a strong firm and rigid construction is effected.

At the upper edge of both sides of the pan the axle is bent inwardly to the point 16 substantially parallel to the central portion 14 of the axle, both end portions 17 of the axle are then bent outwardly substantially parallel to the central portion 14 as clearly shown in Fig. 2.

18 indicates the struts or braces which are secured to the handle 5 at one end and diverge to the sides of the pan to which sides the struts 18 are securely riveted or otherwise fastened along the upper edges of said sides, the ends of said struts or braces being bent downwardly in an oblique direction for the purpose of stiffening and bracing the said sides. As will appear from the drawings each strut or brace 18 is carried around the upright portions of the axle thus forming a strap for said axle to further tie the same rigidly to the pan.

For the purposes of convenience we have arranged a broom rack 20 transversely of the handle 5 and struts 18 upon which a broom can be carried.

Having thus fully described our invention its operation is as follows: The device is pushed over a street or roadway in the usual manner, but the principal advantages of our pan are obtained when operating the same in close proximity to a curbing or other obstruction as will be now apparent. By reason of the construction of the axle 4 the inner portions of the hubs of the wheels 21 extend over the sides of the pan in such manner that the wheels proper lie in close proximity to the sides of the pan as clearly shown, and as the mouth of the pan is flared to such an extent that it is slightly wider than the wheel gage the pan can be operated close up to and in contact with a curbing or other obstruction without striking the wheels or leaving any space between the mouth of the pan and the curbing or the like. The advantages of this construction are at once apparent as by means of this every portion of a street or roadway is reached in order to thoroughly and quickly clean the same.

The extreme strength and simplicity of the device are also obvious, while the reduced cost of manufacture and the minimum number of parts are also material features.

Having thus fully described our invention what we claim as new and desire to secure by Letters Patent of the United States is:—

1. A device of the character described comprising a pan having a flaring mouth, an axle upon which the bottom of said pan rests, the said axle being bent upwardly to conform to the sides and depth of the pan, the said axle being bent inwardly over the sides of the pan and then outwardly, wheels on said axle, the hub of said wheels extending over the sides of the pan in such manner that the distance between the two wheels is less than the width of the mouth of the pan.

2. A device of the character described comprising a pan having a flaring mouth, an axle upon which the bottom of said pan rests, the said axle being bent upwardly to conform to the sides and depth of the pan, the said axle being bent inwardly over the sides of the pan and then outwardly, wheels on said axle, the hub of said wheels extending over the sides of the pan.

3. A device of the character described comprising a pan having a flaring mouth, a combined cradle and axle supporting said pan, said axle being provided near each end thereof with a loop extending inwardly over the edge of the pan, wheels on said axle, the inner portion of the hub of said wheels being accommmodated in said loops, substantially as described.

4. A device of the character described comprising a pan, a combined cradle and axle supporting said pan, said axle being provided near each end thereof with a loop extending inwardly over the edge of the pan, wheels on said axle, the inner portion of the hub of said wheels being accommodated in said loops, substantially as described.

In testimony whereof, we affix our signatures, in presence of two witnesses.

WILLIAM HENRY ROLFE.
CHARLES HENDERSON BAKER.

Witnesses:
JOSEPH W. MURPHY,
BERNICE STOOPS.